Oct. 6, 1931.  J. S. ADAMS ET AL  1,826,590
WINDSHIELD AND CAR HEATING DEVICE
Filed Jan. 17, 1930  2 Sheets-Sheet 1
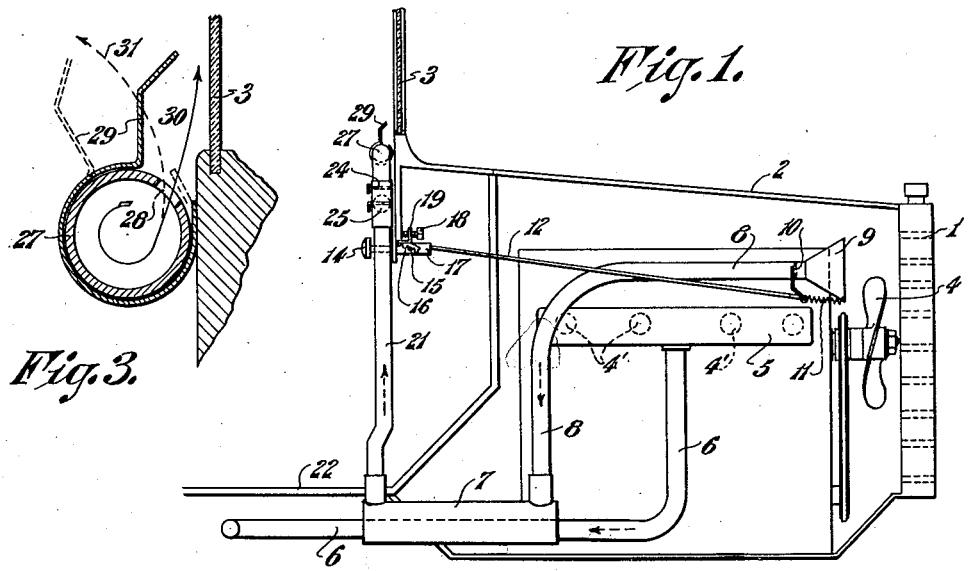
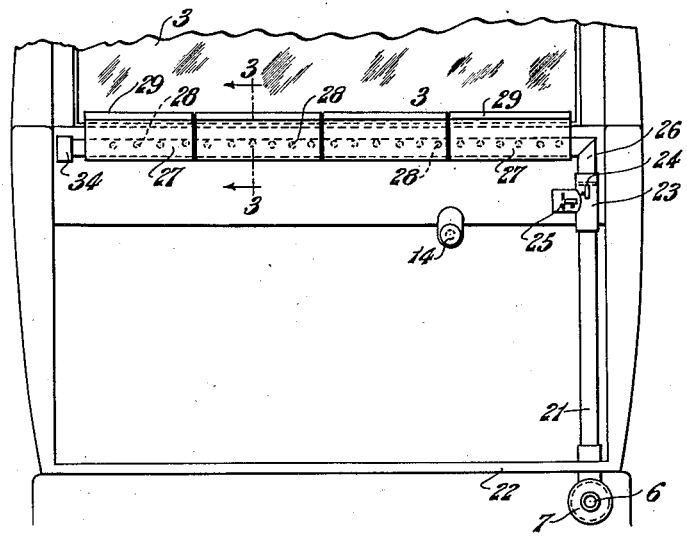
INVENTORS,
John S. Adams,
Bert Miller,
BY
Harry W. Bowen.
ATTORNEY.

Oct. 6, 1931.  J. S. ADAMS ET AL  1,826,590
WINDSHIELD AND CAR HEATING DEVICE
Filed Jan. 17, 1930  2 Sheets-Sheet 2
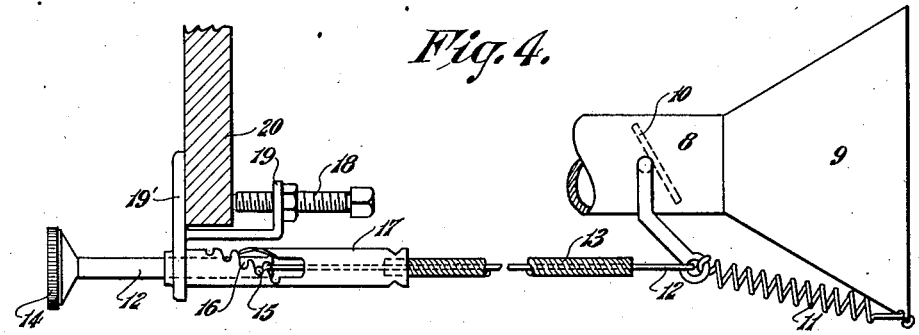
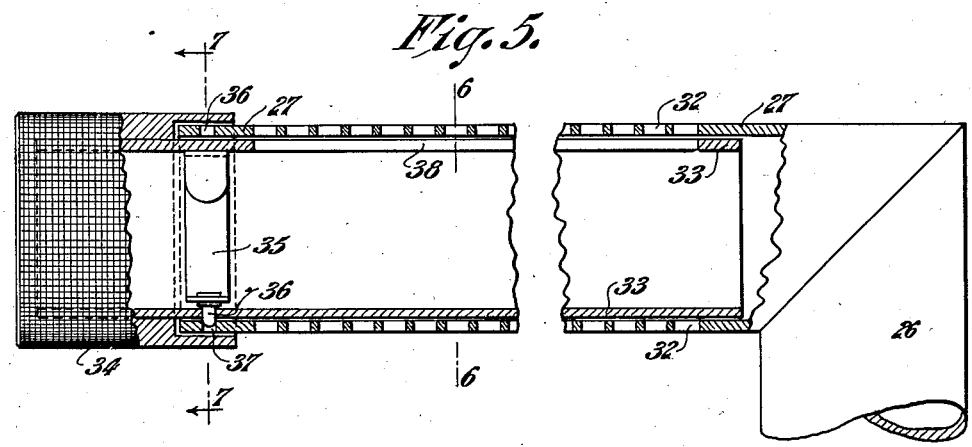
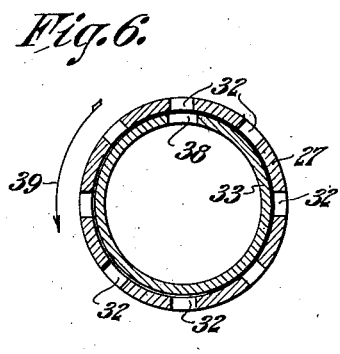
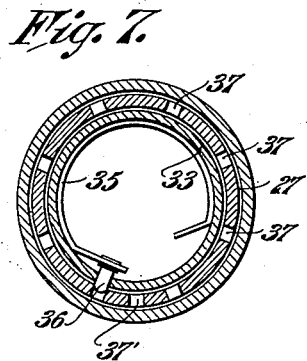
INVENTORS,
John S. Adams,
Bert Miller,
BY
Harry W. Bowen.
ATTORNEY.

Patented Oct. 6, 1931

1,826,590

UNITED STATES PATENT OFFICE

JOHN S. ADAMS AND BERT MILLER, OF ADAMS, MASSACHUSETTS

WINDSHIELD AND CAR HEATING DEVICE

Application filed January 17, 1930. Serial No. 421,473.

This invention relates to improvements in a windshield heating device for maintaining the windshield of a motor vehicle free from ice and moisture during the cold weather. A primary object of our improvement is to heat the inner surface of the windshield by means of a current of warm air from a perforated or slotted member which is located within the motor vehicle and adjacent the lower inner edge of the windshield, whereby, when a current of heated air is directed against the windshield, it will be sufficiently warmed, after a short period of time, to maintain the windshield free from ice, snow or moisture. The windshield wiper device is also operative. The heated air is derived from a casing member which surrounds a portion of the exhaust pipe or other suitable parts of the motor. A pipe is connected to one end of the casing which extends forwardly to a point which is adjacent the cooling fan. Connected to the opposite end of this casing member is a second pipe which passes upward and is connected to a perforated member of suitable size which is located, as stated, adjacent the inner and lower surface of the windshield. The operation of the fan, together with the motion of the vehicle, causes a current of air to pass thru the casing member which surrounds the exhaust pipe, whereby the air is heated and then delivered to the interior of the car and also onto the inner surface of the windshield. Valve means are provided for completely shutting off the flow of air thru the apparatus, also for directing the heated air onto the windshield or into the car body, as desired, in the present application, we have disclosed a pipe member which is formed with a plurality of rows of perforations and means for directing the heated air onto the windshield or into the car, as for example on to the steering wheel, for the purpose of warming the hands of the operator or downward onto the feet. Further objects and nature of the invention will appear in the body of the specification and will be particularly pointed out in the claims with reference to the accompanying drawings.

Referring to the drawings:

Fig. 1 is a view showing a portion of the attachment located within the hood of a motor vehicle and a portion within the car, also the casing member which surrounds a part of the exhaust pipe, and, the pipe connections for conveying the heated air to the perforated pipe where it escapes against the inner surface of the windshield.

Fig. 2 is a view looking from the lefthand end of Fig. 1.

Fig. 3 is a detail sectional view on the line 3—3 of Fig. 2 looking in the direction of the arrows showing the movable deflecting member located on the perforated pipe.

Fig. 4 is an enlarged detail view of the valve located within the entrance pipe adjacent the fan and the means for adjusting the valve into different positions.

Fig. 5 is a modification of the perforated pipe showing a plurality of rows of perforations and the adjustable means for opening and closing different rows.

Fig. 6 is a detail sectional view on the line 6—6 of Fig. 5, and

Fig. 7 is a detail sectional view on the line 7—7 of Fig. 5 showing the means for adjustably retaining the member which opens and closes the different rows of perforations in the pipe or tubular member.

Referring to the drawings in detail:

1 designates the usual radiator part of the motor vehicle, 2 the hood, 3 the windshield, 4 the usual cooling fan and the cylinders at 4'. The manifold is indicated at 5 for carrying off the heated products of combustion from the engine and is connected to the exhaust pipe 6. Surrounding the exhaust pipe 6 is a tubular casing 7, to the forward end of which is attached the pipe 8, which has communication with the interior of the casing and which terminates adjacent the fan 4 with the funnel shaped end 9. Located within the pipe 8 is a closure valve 10. This valve is normally closed by means of the action of the spring 11. This valve may be opened and held in different adjusted positions by means of the rod 12, which passes through a tubular member made up of coiled wire, as indicated at 13. The rod 12 is actuated by the hand member 14 within the car. Secured to the rod 12 is a pin 15 which enters any one of the spaced notches 16 in the fixed tube 17. By pulling inward on the hand piece 14 against the tension of the spring 11, the valve 10 may be opened and adjustably retained by the pin 15 in any one of the notches 16, when slightly rotated, as readily understood. 18 designates a clamping screw passing through the bracket part 19 for attaching the inner end of the rod 12 to a fixed part 20, as the cowl of the motor vehicle. A co-operating bracket is indicated at 19'. 21 designates a pipe connected to the rear end of the casing member 7 and having communication with the interior. It extends upward thru the bottom of the car, indicated at 22, or may be located in any other convenient place, as under the cowl. The upper end of the pipe 21 enters a T-shaped member 23 in which are located two valves 24 and 25, as shown. 26 is an elbow member connected to the T-shaped member 23 and this member is connected to the perforated tubular member 27 which extends the entire length of the windshield. It is secured to a fixed part of the vehicle and adjacent the lower inner surface of the windshield 3, as shown clearly in the detail view in Fig. 3 and in the general elevational view in Fig. 2. This pipe 27 is formed with a plurality or row of perforations 28. Movably located on the tubular member 27 are several air deflecting members 29 for the purpose of directing the heated air upward against the inner surface of the windshield, as indicated by the arrow 30. The member 29 is rotatably retained by friction on the perforated tubular member 27 in order to permit it to be turned inwardly, as indicated by the arrow 31.

In operation, as the vehicle moves forward, or, the engine is running, the fan 4 will draw fresh air thru the radiator 1 into the funnel-shaped member 9, thru the pipe 8, into the casing member 7 which surrounds the hot exhaust pipe 6. The fresh air is heated within this casing member and passes upward thru the pipe 21 and out through the perforations 28 against the inner surface of the windshield 3. It is understood that the valve 10 is now opened, the valve 25 closed, and the valve 24 opened. If it is desired, to heat the interior of the car, when there is no moisture collecting on the windshield, the valve 10 is opened. the valve 24 is closed and the valve 25 is opened.

Referring to Figs. 5, 6, and 7 in which the pipe 27, instead of being formed with a single row of perforations as 28, is formed with a plurality of rows of perforations, indicated at 32. Located within the tubular member 27 is a rotatable tubular member 33 of any desired length. Secured to the end of the tubular member 33 is a closure cap 34. Located within the rotatable tubular member 33 is a leaf spring 35, one end of which is provided with a pin 36, as shown, which is designed to enter one of the openings 37 in the pipe 27. The member 33 is formed with a single longitudinal slot 38 which is designed to register with any one of the rows of perforations 32, when rotated, as shown in Fig. 6. The spring actuated pin 36 will enter an opening 37 and will retain the member 33 in any one of its adjusted positions for aligning the longitudinal slot 38 with any one of the rows of perforations 32, whereby the escaping warm air may be directed in different radial lines from the tubular member 27, depending upon the position of the longitudinal slot 38 relative to the rows of perforations 32, as indicated by the arrow 39.

It is obvious that the click of the pin 36 will indicate to the user that the slot 38 and a line of perforations 32 are in register. The opening 37' is to receive the pin 36 when it is desired to close all of the rows of openings 32.

The tubular member 33 is rotated by the operator grasping the milled or knurled end 34, whenever he wishes to open or close any one of the rows of openings 32 for directing the heated air, either onto the windshield 3 or into the car body, as desired.

It is obvious that the device may be used in the summer time to supply fresh air to the interior of the car by directly connecting pipe 8 to pipe 21 and not causing the air to pass through the casing member 7. It is, therefore, a fresh air ventilator with either hot or cold air.

The pipes 21 and 33 may be incorporated in the cowl of the car, as an integral part thereof. The device may, of course, be used as a hand heater or a foot heater. There are no moving parts to get out of order and it is not connected to the battery in any way. It may readily be attached to a hot water or hot air heater that is already installed.

Obvious changes and modifications may be made, without departing from the scope of our invention.

What we claim is:

1. A fixed pipe connected to a warm air supply for the purpose described and formed with a plurality of rows of openings which are longitudinally arranged, a member rotatably mounted within the said pipe and formed with a single longitudinal opening designed to register with any one of said rows of perforations, when rotated, for changing the directions the warm air escapes from the perforated pipe, a closure end cap secured to the rotatable member for rotating the same, and spring pin means within said pipe for adjustably retaining the rotatable member in different positions in the perforated pipe, said pin entering openings in the end portion of the fixed pipe.

2. A pipe connected to a warm air supply for the purpose described and formed with a plurality of rows of openings and located adjacent a part to be heated, as a windshield, a tubular member rotatably mounted relative to the said pipe and formed with a single longitudinal opening designed to register with any one of said rows of perforations, when rotated, for changing the directions the warm air escapes from the rows of openings in said pipe, and means for adjustably retaining the tubular member in different positions in the pipe having rows of openings, said means comprising a spring actuated pin part carried by the rotatable member and engaging the perforated pipe.

JOHN S. ADAMS.
BERT MILLER.